United States Patent [19]
Offer

[11] 3,776,384
[45] Dec. 4, 1973

[54] REPLACEABLE ELEMENT COOLANT FILTER

[75] Inventor: Robert J. Offer, Racine, Wis.
[73] Assignee: Tenneco Inc., Racine, Wis.
[22] Filed: July 12, 1972
[21] Appl. No.: 271,063

[52] U.S. Cl.............. 210/209, 210/437, 210/457, 210/493
[51] Int. Cl............................................ B01d 27/00
[58] Field of Search................ 210/202, 209, 437, 210/457, 493

[56] References Cited
UNITED STATES PATENTS

| | | | |
|---|---|---|---|
| 1,830,742 | 11/1931 | McKinley | 210/437 |
| 2,696,915 | 12/1954 | Kasten et al. | 210/437 X |
| 2,995,250 | 8/1961 | Boewe et al. | 210/457 X |
| 3,043,436 | 7/1962 | Farrey | 210/457 X |
| 3,058,592 | 10/1962 | Nugent | 210/457 X |
| 3,357,563 | 12/1967 | Sicard | 210/209 |
| 3,516,549 | 6/1970 | MacDonnell | 210/493 X |

Primary Examiner—Samih N. Zaharna
Assistant Examiner—Richard W. Burks
Attorney—J. King Harness et al.

[57] ABSTRACT

A pleated paper filter element is adapted for use in an existing water filter housing for internal combustion engine cooling systems by means of a grommet that serves to seat the element and seal it around the housing outlet.

7 Claims, 5 Drawing Figures

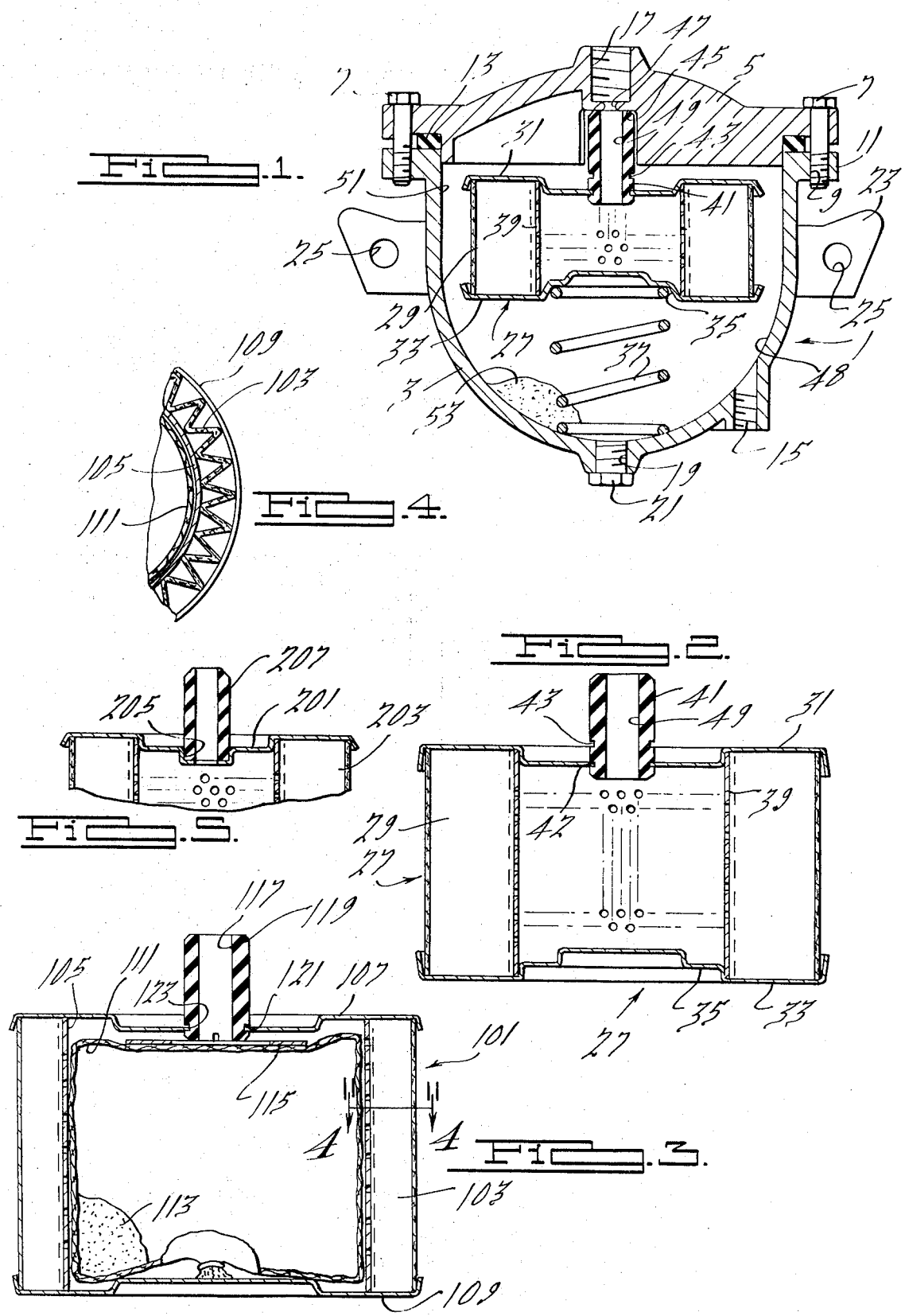

REPLACEABLE ELEMENT COOLANT FILTER

BRIEF SUMMARY OF THE INVENTION

It is the purpose of the invention to provide an improved filter means for coolant filter units now installed on many internal combustion engine powered vehicles, particularly trucks.

The invention accomplishes this purpose by means of a pleated paper filter element and a grommet for positioning and sealing the element with respect to the outlet of the filter housing.

DESCRIPTION OF THE DRAWINGS

FIG. 1 is a vertical cross section through a coolant filter unit containing the invention;

FIG. 2 is an enlarged cross section through a filter element similar to that shown in FIG. 1;

FIG. 3 is a cross section through a modified form of filter element;

FIG. 4 is a cross section along the line 4—4 of FIG. 3; and

FIG. 5 is a partial section through a further modification.

DETAILED DESCRIPTION OF THE INVENTION

The filter unit 1 of FIG. 1 has a housing which comprises a bowl-shaped base casting 3 which is open on top when the top is not closed by the cover member 5. Bolts 7 thread into holes 9 in a flange 11 of the housing 3 to firmly attach the cover thereto, sealing being achieved by means of the gasket or sealing member 13. The filter has an inlet 15 in base 3 and an outlet 17 in the cover 5, both of which may be threaded for suitable connection to conduits used in the cooling system. The outlet 17 is substantially coaxial with the cover and bowl. The bowl 3 may have a clean out opening 19 which is normally closed by means of the plug 21. The base 3 has a lateral flange 23 with openings 25 therein whereby the filter may be mounted in a suitable position on the engine or chassis of the vehicle with which the filter is associated.

Within the bowl 3 is a filter element 27 which may be of various specific constructions but, in accordance with the invention, a pleated paper filter material 29 is used as the filter medium. In accordance with usual practice, the pleated paper 29 is arranged in an annulus about the axis of the filter element 27 and the opposite ends are bonded and sealed by a suitable adhesive to the upper and lower end plates 31 and 33. The bottom plate 33 is imperforate and may have a recess section 35 that serves to center a spring 37 that urges the filter element 27 to an upward position where it seats adjacent the outlet opening 17 as will be presently described. Extending between the end plates 31 and 33 is a perforated center sleeve 39 which provides some axial strength to the assembly. The space inside the sleeve 39 forms an outlet chamber for coolant that has been filtered by passage through the paper 29. The end cap 31 has a central opening in which is mounted a resilient outlet tube or rubber grommet 41, the grommet preferably having an annular recess 42 that receives the edge of the end cap plate 31. The grommet 41 may have an additional recess 43 that can be fitted into the opening in the cap 31 so as to permit the assembly of grommet and filter to be axially adjusted in length to different specific types of housings that may be encountered in actual usage, it being recognized that the grommet may be easily projected through the opening in plate 39.

The top end of the rubber grommet seats against a surface 45 within the cover 5 and this surface has a central outlet opening 47 that extends into the threaded outlet opening 17. The grommet 41 is held against the seating surface 45 by means of the spring 37 pressing on the bottom of the filter element 27. Spring pressure plus the resilient nature of tube 41 provides an adequate seal, it being noted that any leakage is of filtered coolant which is merely recirculated through the filter paper.

In use, it will be seen that water to be filtered enters the inlet opening 15, circulates around through chamber 48 inside the bowl 3, and flows through the pleated material 29 from the outside into the center of the sleeve 39. When it reaches this point it is filtered and passes out through the passageway 49 inside of the grommet 41 and then through the opening 47 into the threaded outlet opening 17. No leakage occurs at the surface 45 because the grommet 41 is pressed tightly against the surface 45 and being formed of flexible material, such as rubber, provides an effective seal.

In the past, the filter elements 27 have been of a different type and have sealed around the annular surface 51. It will be seen that the present type of filter element 27 plus the grommet 41 permit the filter element to be replaced readily and, in fact, be substituted for a different type of filter for use with the filter construction 1. It is only necessary to remove the bolts 7 and then remove the cover 5 to replace the filter element 27. In many applications the coolant filter 1 has a mass of chemical material 53 within the bottom portion of the bowl 3 to serve as a conditioner as the water or other coolant enters the bowl 3 through the inlet 15. It will be seen that the coolant first comes in contact with the coolant conditioner chemical and then flows through the filter element 27.

In FIG. 3, a modified filter element 101 is illustrated which is similar in most respects to the filter element 27. Thus, it has a pleated paper filter material 103 which is formed into an annular shape as seen in FIG. 4 and it along with the perforated center sleeve 105 are confined between the upper and lower end caps 107 and 109, the paper being bonded in a sealed fluid tight fashion to the end caps by means of suitable adhesive material. Located within the center sleeve 105 is a perforate bag 111 that contains the chemical coolant conditioner material 113. Also, within the sleeve 105 is an annular sacrificial anode 115 which is normally made of magnesium and is located so that it does not interfere with coolant reaching the center passage 117 of the rubber grommet 119 that has a recess 21 whereby it receives and fits around the edge of the opening 123 in the upper end cap 107.

FIG. 5 shows a further modification in which the end cap 201 of the filter element 203 has a recess 205 which has a press fit to snugly hold the outer diameter of a rubber tube 207 that serves as the grommet for mounting the filter element within the cover 5 and seating and sealing it against the surface 45. Obviously, the tube 207 can be easily removed from the recess 205 and replaced with one of different length, should that be desirable to suit a particular installation.

Thus, the invention provides a means to easily replace the original bag or depth type filter element of a coolant filter with a pleated paper filter element. Modifications in the specific structure shown may be made without departing from the spirit and scope of the invention.

I claim:

1. In a coolant filter for the cooling system of an internal combustion engine, said filter having a housing with an outlet passage and a surface around the inlet end of the outlet passage, a filter element comprising an annulus of pleated paper and end caps secured to the opposite ends of the paper and defining an outlet chamber inside the annulus for coolant filtered by passage through the paper, and a resilient outlet tube for said outlet chamber mounted on and supported by one of said end caps and seated on said furface in sealed communication with the outlet passage.

2. A filter as set forth in claim 1 wherein said one end cap has an outlet opening, said tube has a plurality of annular recesses on the outer surfe of a size to receive the edge of said end cap opening whereby the tube may be mounted to project different axial distances from the end cap.

3. A filter as set forth in claim 1 wherein said one end cap has a recess formed therein and said outlet tube is press fitted in said recess.

4. A coolant filter element comprising an annulus of filter material, end plates secured to opposite end faces of the annulus, and a rubber like outlet tube for coolant passing through the annulus attached to one of the end plates and projecting away from the annulus.

5. A filter element as set forth in claim 4 including a bag containing coolant conditioner located inside of said annulus.

6. A filter element as set forth in claim 4 including a notch means securing the tube to the plate.

7. A filter element as set forth in claim 4 including press fit means securing the tube to the plate.

* * * * *